(12) United States Patent
Hirano et al.

(10) Patent No.: US 7,617,379 B2
(45) Date of Patent: Nov. 10, 2009

(54) MULTI-HIT CONTROL METHOD FOR SHARED TLB IN A MULTIPROCESSOR SYSTEM

(75) Inventors: Takahito Hirano, Kawasaki (JP); Iwao Yamazaki, Kawasaki (JP); Tsuyoshi Motokurumada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 201 days.

(21) Appl. No.: 10/986,891

(22) Filed: Nov. 15, 2004

(65) Prior Publication Data
US 2006/0026382 A1 Feb. 2, 2006

(30) Foreign Application Priority Data
Jul. 29, 2004 (JP) ............................. 2004-222041

(51) Int. Cl.
*G06F 12/10* (2006.01)
(52) U.S. Cl. .................. 711/207; 711/202; 711/203; 711/205; 711/210
(58) Field of Classification Search ................ None
See application file for complete search history.

(56) References Cited

U.S. PATENT DOCUMENTS 5,680,566 A 10/1997 Peng et al. ................. 395/416
5,893,931 A * 4/1999 Peng et al. ................. 711/206
2004/0064654 A1 4/2004 Willis et al. ................. 711/150

FOREIGN PATENT DOCUMENTS

| EP | 0244532 | 11/1987 |
| JP | 2-300951 | 12/1990 |
| JP | 11-501745 | 2/1999 |

\* cited by examiner

*Primary Examiner*—Matt Kim
*Assistant Examiner*—Kaushikkumar Patel
(74) *Attorney, Agent, or Firm*—Staas & Halsey LLP

(57) ABSTRACT

The present invention comprises, for enabling sharing an address translation buffer (TLB=Translation Lookaside Buffer) between plural threads without generating undesirable multi-hits in an information processor which operates in multi-thread mode, an address translation buffer for storing address translation pairs and thread information, a retriever for retrieving an address translation pair of a virtual addresses identical to said virtual address from the address translation buffer for translating the virtual address into a physical address, a determination unit for determining, when plural addresses translation pairs are retrieved by the retriever, whether or not two or more of said thread information are identical among plural thread information corresponding to plural address translation pairs, and a multi-hit controller for suppressing output of multi-hits and directing execution of address translation if the thread information are determined to be different according to the determination unit.

8 Claims, 9 Drawing Sheets

MULTI-HIT CONTROL METHOD FOR SHARED TLB IN A MULTIPROCESSOR SYSTEM

BACKGROUND OF THE INVENTION

1) Field of the Invention

The present invention relates to the technique for translating virtual addresses into physical addresses in an information processor, which operates in multi-thread mode.

2) Description of the Related Art

Conventionally, in an information processor comprising a processor (e.g., CPU: Central Processing Unit or MPU; Micro Processing Unit), there has been a technique wherein a TLB (Translation Lookaside Buffer; an address translation buffer) is provided in the processor (here, CPU) for translating virtual addresses used by the program into physical addresses on a storage (e.g., main memory or cache memory connected to the information processor) which stores the data in the information processor.

The TLB stores address translation pairs (TLB entry) indicating the correspondence between virtual addresses and physical addresses. Using the TLB, the CPU enables high-speed address translation from virtual addresses into physical addresses.

Although address translation pairs to be stored in the TLB are registered by the OS (Operating System) of the information processor, the OS may, on rare occasions, register a plurality of identical address translation pairs.

Thus, if a plurality of identical address translation pairs are registered in the TLB, Multi-Hits are detected by retrieving (referring to) these plurality of address translation pairs when actually executing address translation.

FIG. 8 is an illustration for explaining the multi-hit detection method in a conventional information processor 110. In a conventional information processor 110, the TLB 111 is retrieved and a TLB entry of a virtual address identical to the virtual address to be translated is retrieved in order to translate the virtual address. Then, in the case where, according to the result of retrieval, there is a matching entry (a hit is found) in terms of the TLB entry A (expressed as "entry A" in FIG. 8) stored in WAY 0 (here a WAY refers to a segment of TLB divided into a plurality of segments) of the TLB 111 and the TLB entry B (expressed as "entry B" in FIG. 8) of WAY 1, multi-hits are outputted by a multi-hit controller 112 provided in the information processor 110 if TLB entries A and B are identical.

If multi-hits are detected, the conventional information processor 110, regarding the data (address translation pairs) stored in the TLB 111 as unreliable, deletes and re-register all the address translation pairs stored in the TLB 111, thereby causing a penalty to occur, the penalty being delaying the operation in the CPU during the deletion and re-registration of all the address translation pairs stored in the TLB 111.

In this context, there has been proposed as a method of controlling multi-hits of the TLB, a technique wherein it is checked whether or not a TLB entry is already registered on the TLB when writing a new TLB entry (address translation pair) into the TLB, and, if there exists a TLB entry identical to the TLB entry to be newly written, there is performed overwriting of the already registered TLB entry with the TLB entry to be newly written (see patent document 1 in the following).

In addition, in a technique related to a cache memory device, there has been proposed a technique wherein in the case where a plurality of hits are found in terms of identical data on the cache memory cache-miss is established and the data thereon are deleted (see the following patent document 2).

[patent document 1] Japanese translation of published PCT international patent applications No. Hei 11-501745

[patent document 2] Japanese Patent Laid-Open (Kokai) Hei 2-300951

Now, in recent years, there have been widely used multi-threaded computing techniques, which enable a plurality of threads to run on the processor core of a single CPU. By employing the multi-thread mode, a process including translation of virtual addresses into physical addresses may be assigned to a plurality of different threads (here thread 0 and thread 1) with time intervals therebetween. In such a case, since thread 0 and thread 1 both use the identical address translation pair, it is desirable that TLB resources be shared by the plurality of threads 0 and 1. Thus, sharing TLB resources by a plurality of threads 0 and 1 can improve utilization efficiency of the TLB.

In the conventional technique, however, sharing TLB resources between a plurality of threads 0 and 1 results in undesirable multi-hits, such multi-hits causing said penalty to occur, thereby leading to performance degradation (delay of processing) of the CPU. Undesirable multi-hits are not attributed to malfunction of the OS but to occurrence of TLM misses such as nonexistence of the virtual address to be translated on the TLB. In short, undesirable multi-hits are caused by a plurality of threads 0 and 1 executing simultaneously a process called TLB miss handler, which, due to occurrence of a TLB miss, reads out a page table entry from the main memory, or the like, of the information processor so as to register it in TLB.

FIG. 9 is a flow chart (step S10 to S15) for explaining the cause of occurrence of undesirable multi-hits when the TLB is shared between plural threads in an information processor employing the conventional multi-thread mode. As shown in FIG. 9, in the case where the TLB is shared between a plurality of threads (here, threads 0 and 1) in the information processor employing the conventional multi-thread method, when thread 0 causes a TLB miss to occur during execution of thread 0 (step S10), thread 0 executes the TLB miss handler (TLB entry registration process) (step S11). Now, if thread 0 causes a cache-miss to occur during execution of the TLB miss handler (step S12), this cache miss triggers thread switching, which switches the process in the information processor from thread 0 to thread 1.

Then, if during execution of thread 1, a TLB miss is detected in thread 1 at a virtual address identical to the virtual address in which thread 0 caused the TLB miss (step S13), thread 1 executes the TLB miss handler (TLB entry registration process) (step S14).

After the TLB miss handler of thread 1 is finished (TLB entry registration completion), switching of threads is triggered again, and the process is switched from thread 1 to thread 0, which in turn resumes the TLB miss handler with regard to thread 0 which was sleeping until then (step S15), and thread 0 also completes the TLB miss handler.

Execution of such a process results in the existence of two identical TLB entries on the TLB by the TLB miss of threads 0 and 1. Thus, undesirable multi-hits are detected by referring to these identical TLB entries for subsequent address translation.

SUMMARY OF THE INVENTION

The present invention has been made in view of the above problems and it is an object of the present invention, to enable address translation buffer (TLB=Translation Lookaside Buffer) to be shared between plural threads without causing undesirable multi-hits in an information processor, which operates in multi-thread mode.

To accomplish the above-mentioned object, according to the present invention there is provided an information processor which operates in multi-thread mode comprising an address translation buffer for storing address translation pairs indicating the correspondence between virtual addresses and physical addresses, a retriever for retrieving address translation pairs relating to a virtual address stored in said address translation buffer in order to translate a virtual address obtained for each thread into a physical address, and a multi-hit controller for suppressing output of multi-hits and directing said retriever to execute address translation if a predefined condition is satisfied, when a plurality of identical address translation pairs are retrieved by said retriever.

In addition, to accomplish the above-mentioned object, according to the present invention there is provided an information processor which operates in multi-thread mode comprising an address translation buffer for storing address translation pairs indicating the correspondence between virtual addresses and physical addresses and for storing thread information indicating the thread which registered said address translation pairs, a retriever for retrieving, from said address translation buffer, address translation pairs relating to a virtual address identical to said virtual address in order to translate a virtual address used in each thread into a physical address, a determination unit for determining, when a plurality of address translation pairs relating to a virtual address identical to the virtual address to be translated are retrieved by said retriever, whether or not two or more of said thread information are identical among a plurality of thread information corresponding to a plurality of address translation pairs retrieved by said retriever, and a multi-hit controller for suppressing output of multi-hits and directing said retriever to execute address translation if said plurality of thread information are determined to be different according to said determination unit.

Here, it is preferred that said multi-hit controller outputs multi-hits if two or more of said thread information among said plurality of thread information are determined to be identical by said determination unit.

In addition, to accomplish the above-mentioned object, the information processor of the present invention is an information processor which operates in multi-thread mode, said processor comprising an address translation buffer for storing address translation pairs indicating the correspondence between virtual addresses and physical addresses and for storing thread information indicating the thread which registered said address translation pairs, a retriever for retrieving, from said address translation buffer, an address translation pair relating to a virtual address identical to said virtual address in order to translate the virtual address obtained for each thread into a physical address, a thread comparator for comparing a plurality of thread information corresponding to a plurality of retrieved address translation pairs if a plurality of identical address translation pairs are retrieved by said retriever, and a multi-hit controller for outputting multi-hits if two or more of said thread information are determined to be identical as a result of comparison by said thread comparator, and for directing said retriever to execute address translation if said plurality of thread information are not identical.

Furthermore, to accomplish the above-mentioned object, the information processor of the present invention is an information processor which operates in multi-thread mode, said processor comprising an address translation buffer for storing address translation pairs indicating the correspondence between virtual addresses and physical addresses, an entry unit for registering a virtual address used in each thread and a physical address corresponding to said virtual address into said address translation buffer as said address translation pair, a retriever for retrieving, from said address translation buffer, a virtual address identical to the virtual address of said address translation pair to be registered, when registering said address translation pair by said entry unit, and an entry controller for preventing said entry unit from registering said address translation pair into said address translation buffer if a virtual address identical to the virtual address of the address translation pair to be registered by said entry unit is retrieved by said retriever.

Here, it is preferred that thread information indicating the thread which registered the address translation pair is added to said address translation pair stored in said address translation buffer, said processor further comprises a thread comparator for comparing said thread information added to said address translation pair retrieved by said retriever with the thread using the virtual address of the address translation pair registered by said entry unit, if a virtual address identical to the virtual address of the address translation pair registered by said entry unit is retrieved from said address translation buffer by said retriever, said entry controller directs said entry unit to register said address translation pair into said address translation buffer if said thread information added to said address translation pair retrieved by said retriever is identical to the thread using the virtual address of the address translation pair registered by said entry unit, according to the result of comparison by said thread comparator, and, prevents said entry unit from registering said address translation pair into said address translation buffer if said thread information is not identical to said thread, according to the result of comparison by said thread comparator.

In addition, to accomplish the above-mentioned object, the information processor of the present invention is an information processor which operates in multi-thread mode, said processor comprising an address translation buffer for storing address translation pairs indicating the correspondence between virtual addresses and physical addresses and for storing thread information indicating the thread which registered said address translation pair, an entry unit for registering a virtual address used in each thread and a physical address corresponding to said virtual address into said address translation buffer as said address translation pair, a retriever for retrieving, from said address translation buffer, a virtual address identical to the virtual address of said address translation pair to be registered, when registering said address translation pair by said entry unit, and an entry controller for preventing said entry unit from registering said address translation pair into said address translation buffer if a virtual address identical to the virtual address of the address translation pair to be registered by said entry unit is retrieved from said address translation buffer by said retriever and if the thread information corresponding to said address translation pair retrieved by said retriever is not identical to the thread using the virtual address of the address translation pair to be registered by said entry unit.

Here it is preferred that said entry controller directs said entry unit to register said address translation pair into said address translation buffer if a virtual address identical to the virtual address of the address translation pair to be registered by said entry unit is retrieved from said address translation buffer by said retriever and if the thread information corresponding to said address translation pair retrieved by said retriever is identical to the thread using the virtual address of the address translation pair to be registered by said entry unit.

As mentioned above, according to the present invention, in the case where an address translation pair relating to a virtual address identical to the virtual address to be translated is retrieved from the address translation buffer, output of undesirable multi-hits can be suppressed by setting predefined conditions because no multi-hit is outputted if such predefined conditions are satisfied.

In addition, according to the present invention, in the case where a plurality of address translation pairs relating to a virtual address identical to the virtual address to be translated are retrieved from the address translation buffer, output of undesirable multi-hits caused not by malfunction of the OS but by the fact that the information processor operates in multi-thread mode (i.e., by executing the TLB miss handler in a plurality of threads) can be without fail suppressed, because output of multi-hits is suppressed if the thread information of the plurality of retrieved address translation pairs is not identical to the thread using the virtual address to be translated.

Furthermore, according to the present invention, in the case where a plurality of address translation pairs relating to a virtual address identical to the virtual address to be translated is retrieved from the address translation buffer, multi-hits attributed to malfunction of the OS registering a plurality of identical address translation pairs from the same thread can be output without fail because multi-hits are output if the thread information of the plurality of retrieved address translation pairs is identical to the thread using the virtual address to be translated, whereby security of the information processor can be ensured while taking into account the reliability of the OS of the information processor.

In addition, according to the present invention, in the case where an address translation pair relating to a virtual address identical to the virtual address to be registered by the entry unit is retrieved from the address translation buffer, registration of identical address translation pairs into the address translation buffer is prevented without fail, because registration of address translation pairs by the entry unit is suppressed, whereby occurrence of undesirable multi-hits during address translation can be suppressed.

Furthermore, according to the present invention, in the case where a translation pair relating to a virtual address identical to the virtual address to be registered by the entry unit has been retrieved from the address translation buffer, registration of a plurality of identical address translation pairs into the address translation buffer can be prevented without fail, because registration of the address translation pair by the entry unit is prevented if the thread information relating to the retrieved address translation pair is not identical to the thread using the virtual address to be registered by the entry unit. As a result, occurrence of undesirable multi-hits other than multi-hits due to malfunction of the OS can be suppressed without fail when actually executing address translation using the address translation buffer, and the address translation process can be executed smoothly and without fail.

Moreover, utilization efficiency of the address translation buffer can be improved because registration of identical address translation pairs from different threads into the address translation buffer is prevented, which, as a result, can improve the performance of the address translation process using the address translation buffer.

Also in the case where an address translation pair relating to a virtual address identical to the virtual address to be registered by the entry unit is retrieved from the address translation buffer, since registration of the address translation pair by entry unit is executed if the thread information relating to the retrieved address translation pair is identical to the thread using the virtual address to be registered by the entry unit, occurrence of an event such as registering identical address translation pairs from the same thread is determined to be attributed to malfunction of the OS of the information processor and multi-hits pertaining to this malfunction of the OS are without fail detected and produced in the address translation process using the address translation buffer, whereby security of the information processor can be ensured taking into account the reliability of the OS of the information processor.

DESCRIPTION OF THE PREFERRED EMBODIMENTS

Embodiments of the invention will be described in the following with reference made to the accompanying drawings.

[1] First Embodiment of the Present Invention

First, an information processor and a multi-hit control method according to a first embodiment of the present invention will be described.

Figure 1:
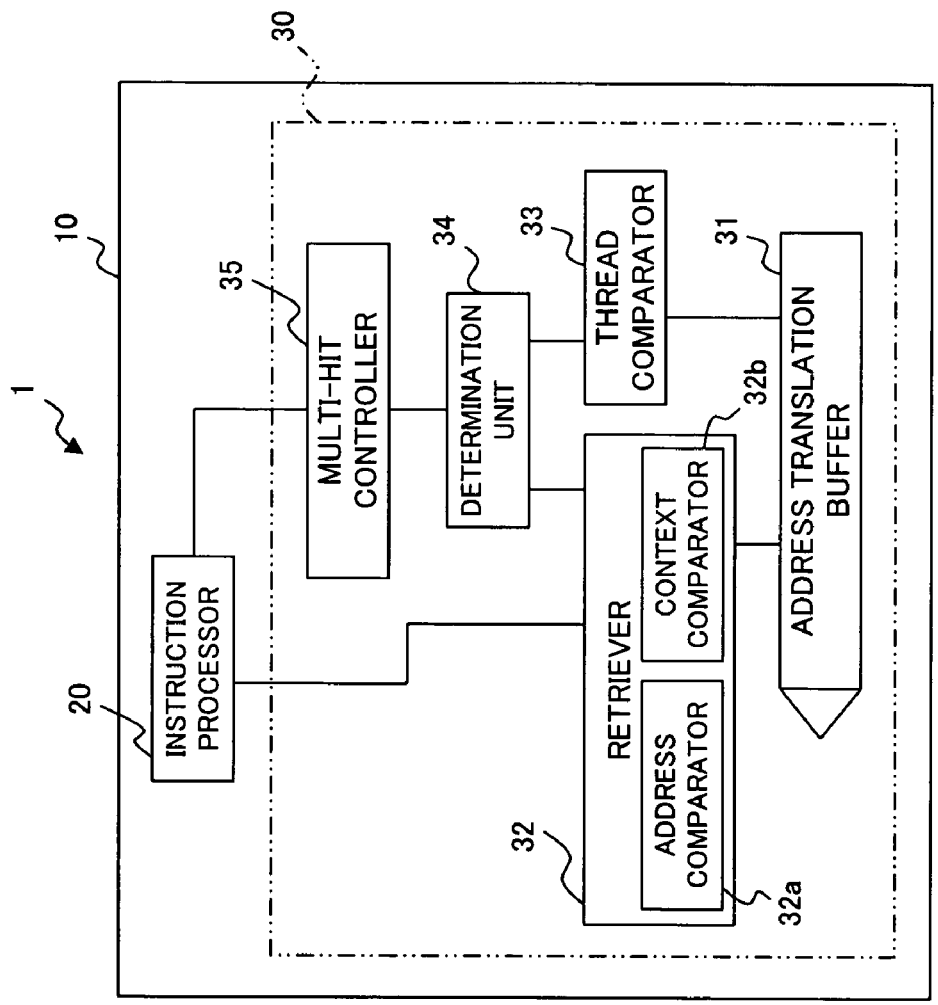
FIG. 1 is a block diagram showing an arrangement of an information processor according to a first embodiment of the present invention.

FIG. 1 is a block diagram showing an arrangement of an information processor 1 according to a first embodiment of the present invention. As shown in FIG. 1, the information processor 1 according to the first embodiment of the present invention is provided, within a computing processor (CPU;

Central Processing Unit) 10, with an instruction processor 20 and an address translation controller (MMU; Memory Management Unit) 30.

Figure 9:
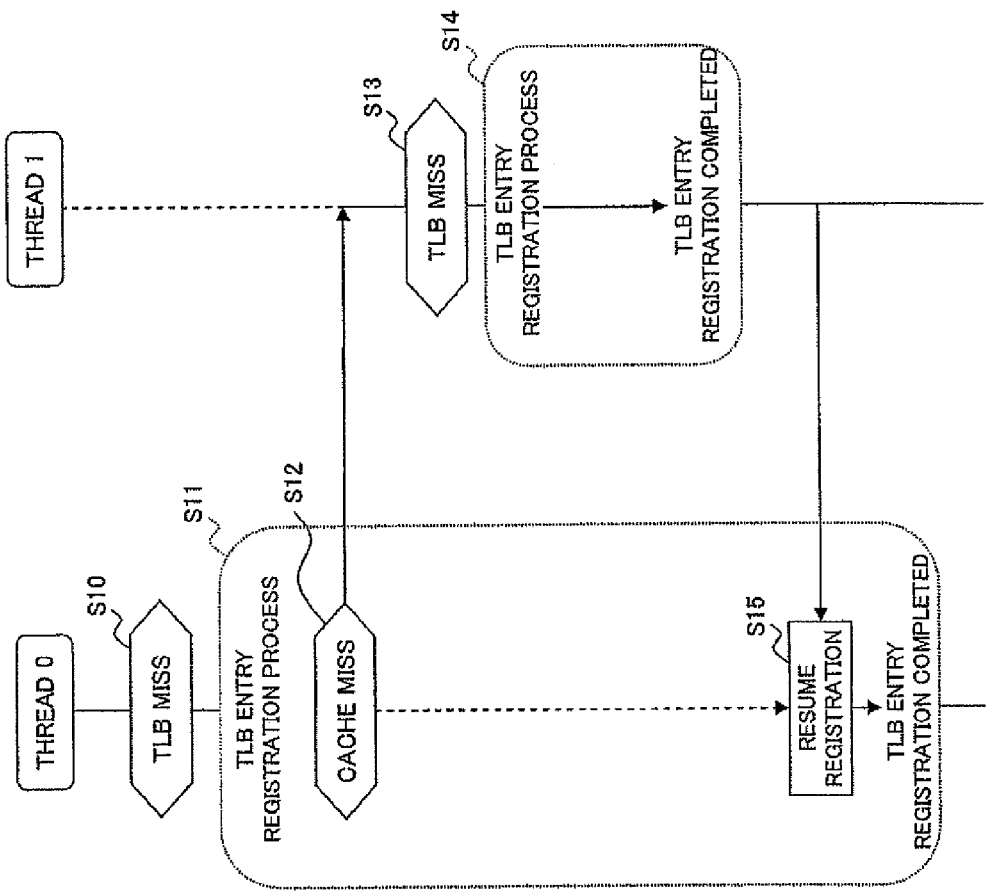
FIG. 9 is a flow chart illustrating the cause of occurrence of undesirable multi-hits occurring when the TLB is shared between plural threads in the information processor employing a conventional multi-thread mode.

The processor unit 10 operates in multi-thread mode, which can execute a plurality of threads (here, threads 0 and 1) in parallel, herein, the time sharing multi-thread mode (VMT: Vertical Multi Thread). Here, VMT mode, processing only one thread at one time, is a mode for realizing multi-thread by switching threads to be processed. Switching of threads in VMT mode is either triggered when a constant time period has passed in one thread, or triggered by detection of slowed execution of instructions due to cache miss, even before the constant time period has passed (see FIG. 9). Note that, switching of threads is performed by halting an active thread while activating another thread.

The instruction processor 20 executes process instructions and, when executing process instructions, translates virtual addresses used by the program into physical addresses on the storage (e.g., cache memory installed within the CPU 10 or external main storage device), which stores data, by an address translation controller 30 described below. The address translation controller 30 is provided for translating virtual addresses entered from the instruction processor 20 into physical addresses, and comprises an address translation buffer (TLB: Translation Lookaside Buffer) 31, retriever 32, thread comparator 33, determination unit 34, and a multi-hit controller 35.

Figure 2:
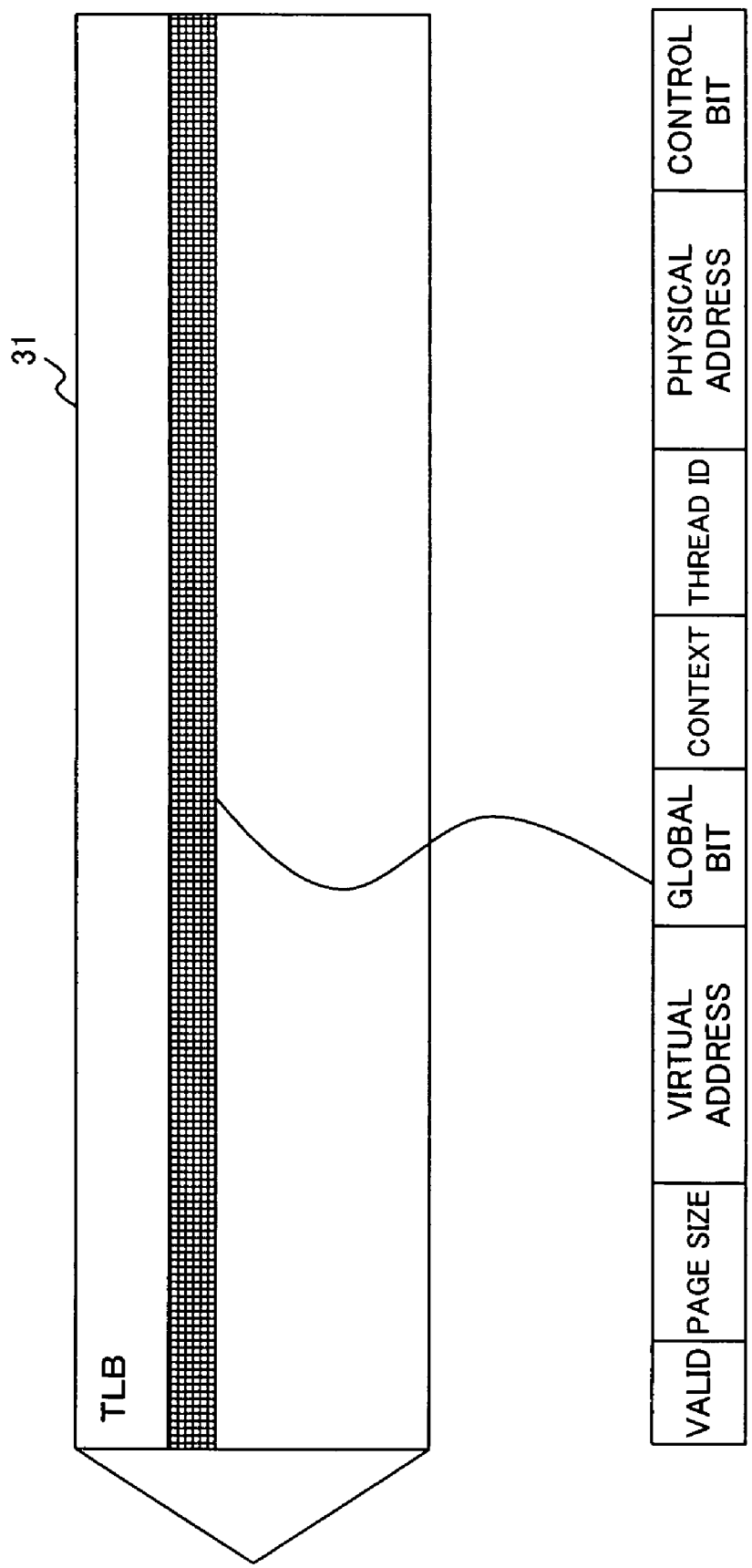
FIG. 2 is a diagram illustrating an address translation pair stored in the address translation buffer of the information processor as the first embodiment of the present invention.

FIG. 2 is diagram illustrating an address translation pair stored in the address translation buffer 31. As shown in FIG. 2, the address translation buffer 31 stores address translation pairs (TLB entry) indicating the correspondence between virtual addresses and physical addresses, and stores, as the address translation pair, a virtual address and a physical address as well as valid/invalid information (Valid), a page size, a global bit (Context valid/invalid information), context, thread information (Thread ID) and a control bit.

Valid/invalid information is information indicating whether the address translation pair is valid or invalid.

A context exists for identifying a local space (individual space) of the address space (i.e., memory space of physical addresses), and a global bit is information indicating whether or not to distinguish contexts. Here, the global bit being "1" (Valid) indicates that contexts are distinguished and referred to (individual region of the memory space is used), whereas the global bit being "0" (invalid) indicates that contexts are not distinguished and referred to (a common region of the memory space is used).

Thread information is information indicating the thread, which registered the address translation pair into the address translation buffer 31.

A control bit is a bit for control, such as, for example, Cacheable-in-Physically-Indexed-Cache bit, Cacheable-in-Virtually-Indexed-Cache bit, Side Effect bit, a Privileged bit, a Writable bit.

The retriever 32 translates virtual addresses to be translated into physical addresses by retrieving, from address translation buffer 31, an address translation pair relating to a virtual address identical to the virtual address to be translated, and comprises an address comparator 32a and a context comparator 32b.

Figure 3:
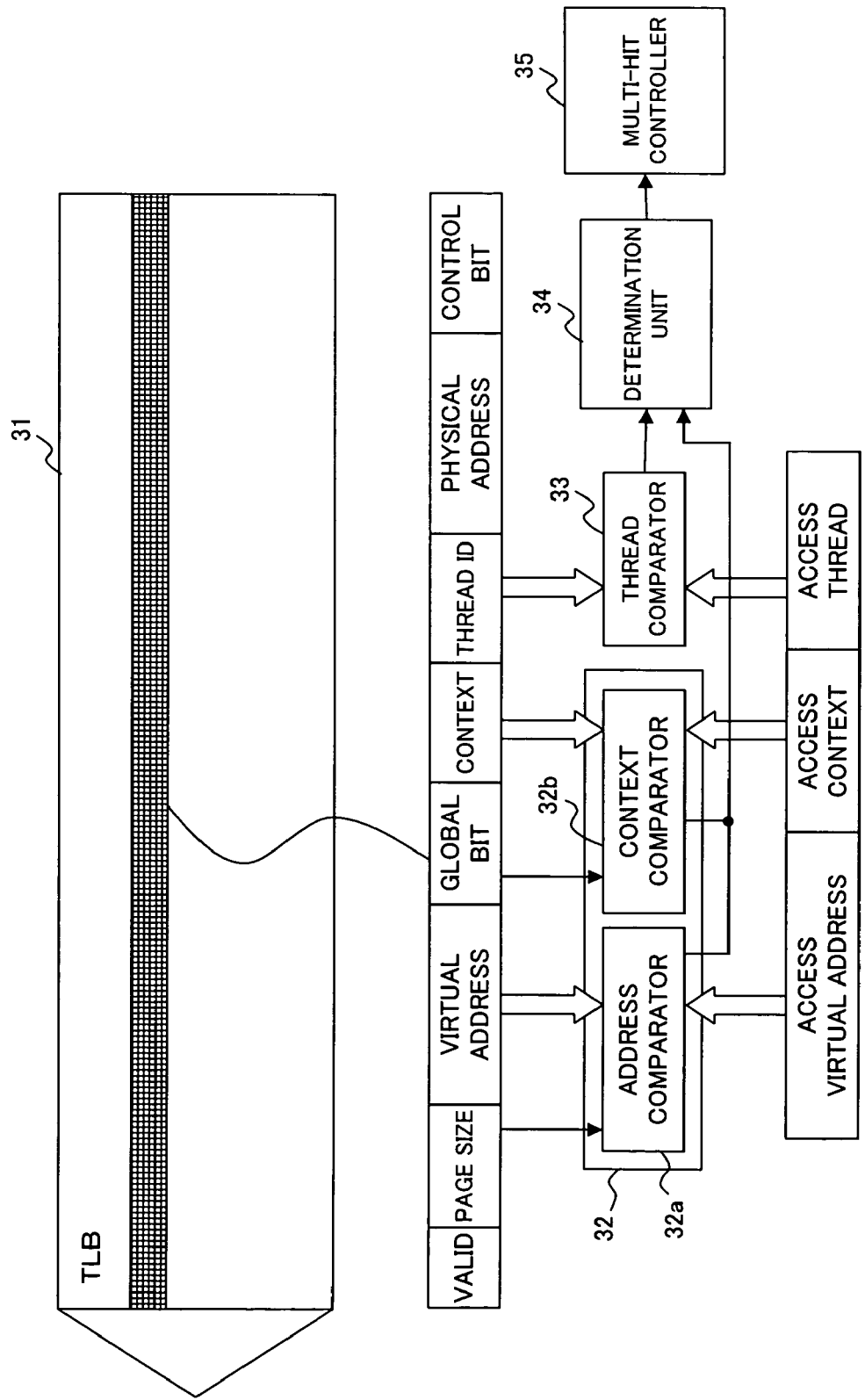
FIG. 3 is a diagram illustrating a retriever and a thread comparator of the information processor according to the first embodiment of the present invention.

FIG. 3 is a diagram illustrating a retriever 32, a thread comparator 33, a determination unit 34, and a multi-hit controller 35 in the information processor 1 according to the first embodiment of the present invention.

As shown in FIG. 3, the address comparator 32a executes comparison of a virtual address to be translated (expressed as "Access Virtual address" in FIG. 3) with the virtual address of the address translation pair stored in the address translation buffer 31. Note that the address comparator 32a refers to the page size stored in the address translation buffer 31 during the comparison.

In addition, the context comparator 32b executes comparison of the context (expressed as "Access Context" in FIG. 3) of the virtual address to be translated with the context of the address translation pair stored in the address translation buffer 31, and refers to the global bit of the address translation pair.

Note that the context comparator 32b determines the match if the global bit of the address translation pair is "1" (Valid) and if the context of the virtual address to be translated is identical to the context of the address translation pair, however skips comparison of the contexts of the virtual address to be translated with the context of the address translation pair if the global bit of the address translation pair is "0" (invalid).

Therefore, the retriever 32 detects the existence, in the address translation buffer 31, of an address translation pair relating to a virtual address identical to the virtual address to be translated, in the case where, according to the result of comparison by the address comparator 32a, the virtual address to be translated is identical to the virtual address of the address translation pair, and further the context of the virtual address to be translated by the context comparator 32b is identical to the context of the address translation pair with the global bit being "1", and in the case where, according to the result of comparison by the address comparator 32a, the virtual address to be translated is identical to the virtual address of the address translation pair, and further the global bit referred to by the context comparator 32b is "0".

The thread comparator 33 executes comparison of the thread (expressed as "Access Thread" in FIG. 3) using the virtual address to be translated with the thread information (Thread ID) indicating the thread, which registered the address translation pair stored in the address translation buffer 31.

The determining unit 34, in addition to determining the results of retrieval by the retriever 32, determines the result of comparison by the thread comparator 33. In other words, it determines whether or not a plurality of address translation pairs are retrieved by the retriever 32, as well, determining whether or not the result of comparison by the thread comparator 33 shows a match.

In other words, the determination unit 34 determines, when a plurality of address translation pairs relating to a virtual address identical to the virtual address to be translated by the retriever 32 is retrieved from the address translation buffer 31, whether or not as a result of comparison of the thread comparator 33 for a plurality of thread information corresponding to the plurality of address translation pairs retrieved by the retriever 32 there is a thread information matching in terms of two or more of thread information among such plurality of thread information.

The multi-hit controller 35 either outputs multi-hits or directs execution of address translation based on the result of retrieval by the retriever 32 as well as the result of determination by the determination unit 34 (i.e., referring to the result of retrieval by the retriever 32 and the result of determination by the determination unit 34), and, in the case where an address translation pair relating to a virtual address identical to the virtual address to be translated is retrieved from the address translation buffer 31 by the retriever 32, directs to execute address translation of the virtual address to be translated into a physical address according to the result of retrieval (i.e., said address translation pair retrieved) by the retriever 32 if a single address translation pair is retrieved.

In addition, the multi-hit controller 35, in the case where a plurality of address translation pairs relating to a virtual address identical to the virtual address to be translated is retrieved by retriever 32, suppresses output of multi-hits and directs the retriever 34 to execute address translation if the result of comparison by the thread comparator 33 for the plurality of address translation pairs retrieved by the retriever 32 is determined to be different by the determination unit 34, however outputs multi-hits if the result of comparison by the thread comparator 33 for the plurality of address translation pairs retrieved by the retriever 32 is determined to be identical to two or more of the thread information among a plurality of thread information by the determination unit 34. Note that the multi-hit controller 35 directs to execute address translation using any one of the plurality of address translation pairs retrieved by the retriever 32 if there is no address translation pair, for which any of the translation pairs as a result of comparison by the thread comparator 33 is determined to be identical.

As described above, with the information processor 1 according to the first embodiment of the present invention, also in the case where, according to the result of retrieval by the retriever 32, a plurality of address translation pairs relating to a virtual address identical to the virtual address to be translated are retrieved, from the address translation buffer 31, by the retriever 32, the determination unit 34 determines the result of comparison by the thread comparator 33 for the plurality of address translation pairs retrieved by retriever 32, and, if the plurality of thread information of such plurality of address translation pairs are different, the multi-hit controller 35 suppresses output of multi-hits and directs execution by the address translation pair.

Figure 4:
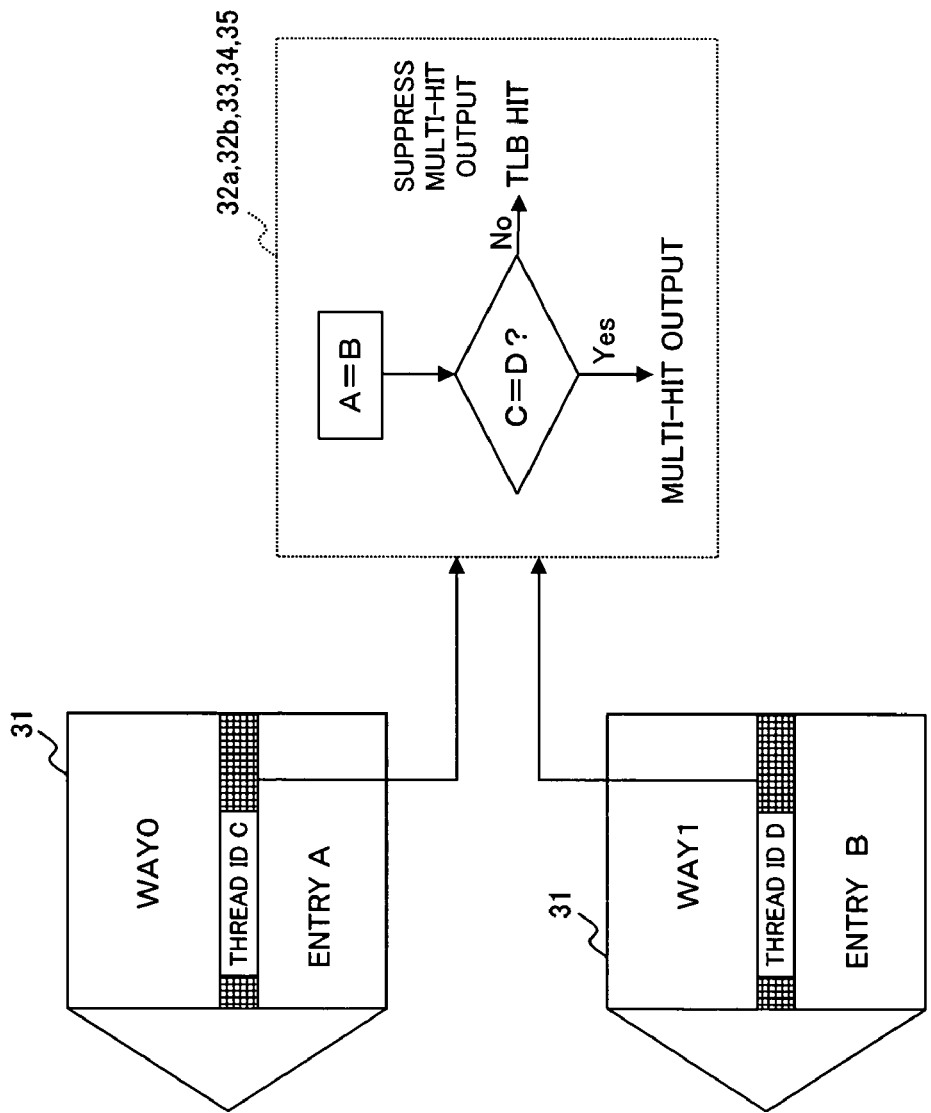
FIG. 4 is a diagram illustrating a multi-hit control method according to the first embodiment of the present invention.

A multi-hit control method (operation of the information processor 1) as the first embodiment of the present invention will be described next. FIG. 4 is a diagram illustrating the multi-hit control method according to the first embodiment of the present invention. As shown in FIG. 4, with the information processor 1 of the present invention, the address comparator 32a searches within the address translation buffer 31 and retrieves the address translation pair of the virtual address identical to the virtual address to be translated in order to translate the virtual address used by the thread.

Then, in the case where, according to the result of retrieval by the address comparator 32a, the address translation pair A (expressed as "entry A" in FIG. 4) stored in WAY 0 (here a WAY refers to a segment of the address translation buffer 31 divided into a plurality of segments) of the address translation buffer 31 and the address translation pair B (expressed as "entry B" in FIG. 4) stored in WAY 1 hit, in other words, if these address translation pairs A and B are identical and the address translation pairs A and B are both the virtual address pairs relating to a virtual address to be translated, multi-hit controller 35 refers to the result of determination by the determination unit 34, and multi-hits are output if the result of determination by the determination unit 34 indicates that the thread using the virtual address to be translated and the thread information of the address translation pairs A and B [here, thread information of the address translation pair A is thread information C (expressed as "Thread ID C" in FIG. 4), and thread information of the address translation pair B is thread information D (expressed as "Thread ID D" in FIG. 4)] match (being identical) (i.e., thread information C and thread information D are identical).

On the other hand, in the case where the result of determination by the determination unit 34 indicates that only one of the thread information of the address translation pairs A and B is identical to the thread using the virtual address to be translated (i.e., in the case where thread information C and thread information D are not identical), the multi-hit controller 35 suppresses output of multi-hits and directs address translation by the address translation pair having the thread information coinciding with the thread using the virtual address to be translated (i.e., regarded as a TLB hit).

In other words, in the multi-hit control method according to the first embodiment of the present invention, multi-hits are outputted only if the determination unit 34 determines that the result of comparison by the thread comparator 33 for the plurality of address translation pairs retrieved by the retriever 32 indicates that the thread information of at least two address translation pairs is identical to the thread using the virtual address to be translated, in the case where thread information indicating the thread which registered the address translation pair is added to said address translation pair stored in the address translation buffer 31, and the thread using the virtual address to be translated is compared with the thread information added to the address translation pair by the thread comparator 32, and a plurality of address translation pairs relating to a virtual address identical to the virtual address to be translated are retrieved by the retriever 32.

As described above, in the information processor 1 and the multi-hit control method according to the first embodiment of the present invention, by adding thread information indicating the thread which registered the address translation pair to the address translation pair, and referring, by means of the multi-hit controller 35, to the determination by the determination unit 34 of the result of thread comparison by the thread comparator 33, multi-hits due to malfunction of the OS registering a plurality of identical translation pairs from the same thread are without fail output while suppressing output of undesirable multi-hits which are not attributed to malfunction of the OS, because output of multi-hits is suppressed if the result of comparison by the thread comparator 33 shows a difference, however outputs multi-hits if the result of comparison by the thread comparator 33 shows a match, also in the case where a plurality of address translation pairs are retrieved by the retriever 32. Therefore, occurrence of the penalty of deleting and re-registering all the address translation pairs in the address translation buffer 31 due to undesirable multi-hits can be suppressed thereby preventing performance degradation (delay of processing) of the CPU 10.

Figure 8:
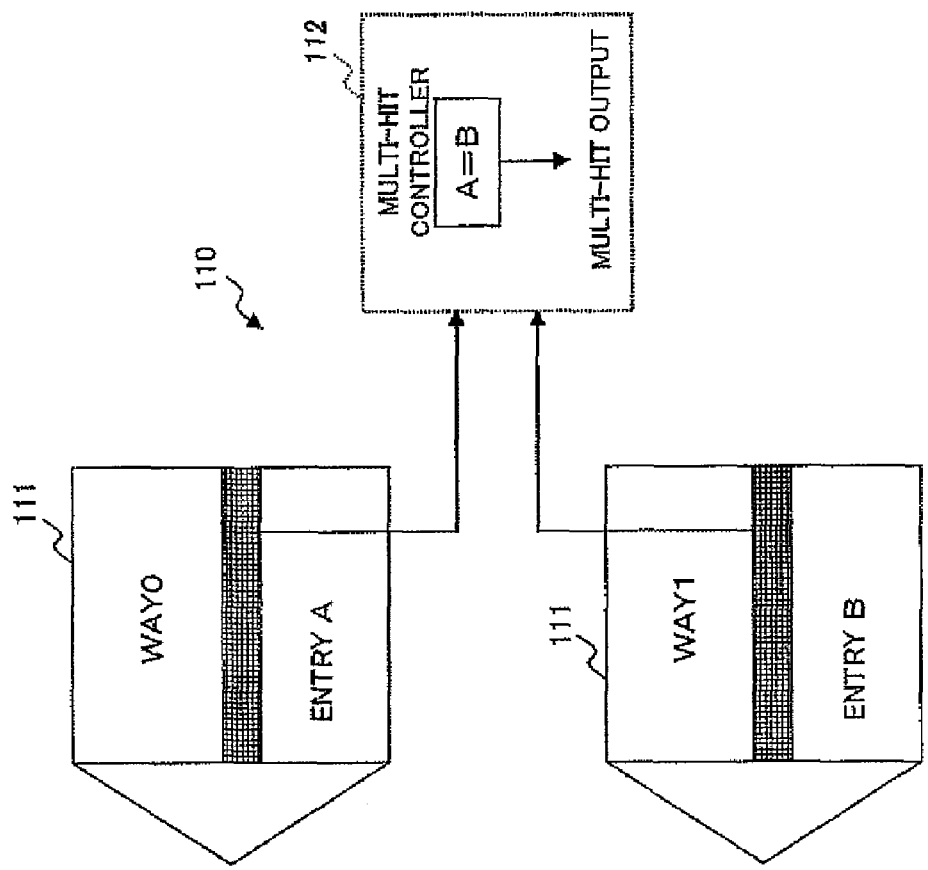
FIG. 8 is a diagram illustrating the multi-hit detection method according to a conventional information processor.

In addition, the information processor 1 and the multi-hit control method according to the first embodiment of the present invention can be implemented by a slight modification applied to the conventional information processor mentioned above with reference to FIG. 8, i.e., simply adding thread information to the address translation pairs and adding a comparison and determination function of thread information. Thereby there can be achieved advantages facilitating implementation applicable to conventional information processors.

[2] Second Embodiment of the Present Invention

The information processor and the multi-hit control method according to the second embodiment of the present invention will be described next.

Figure 5:
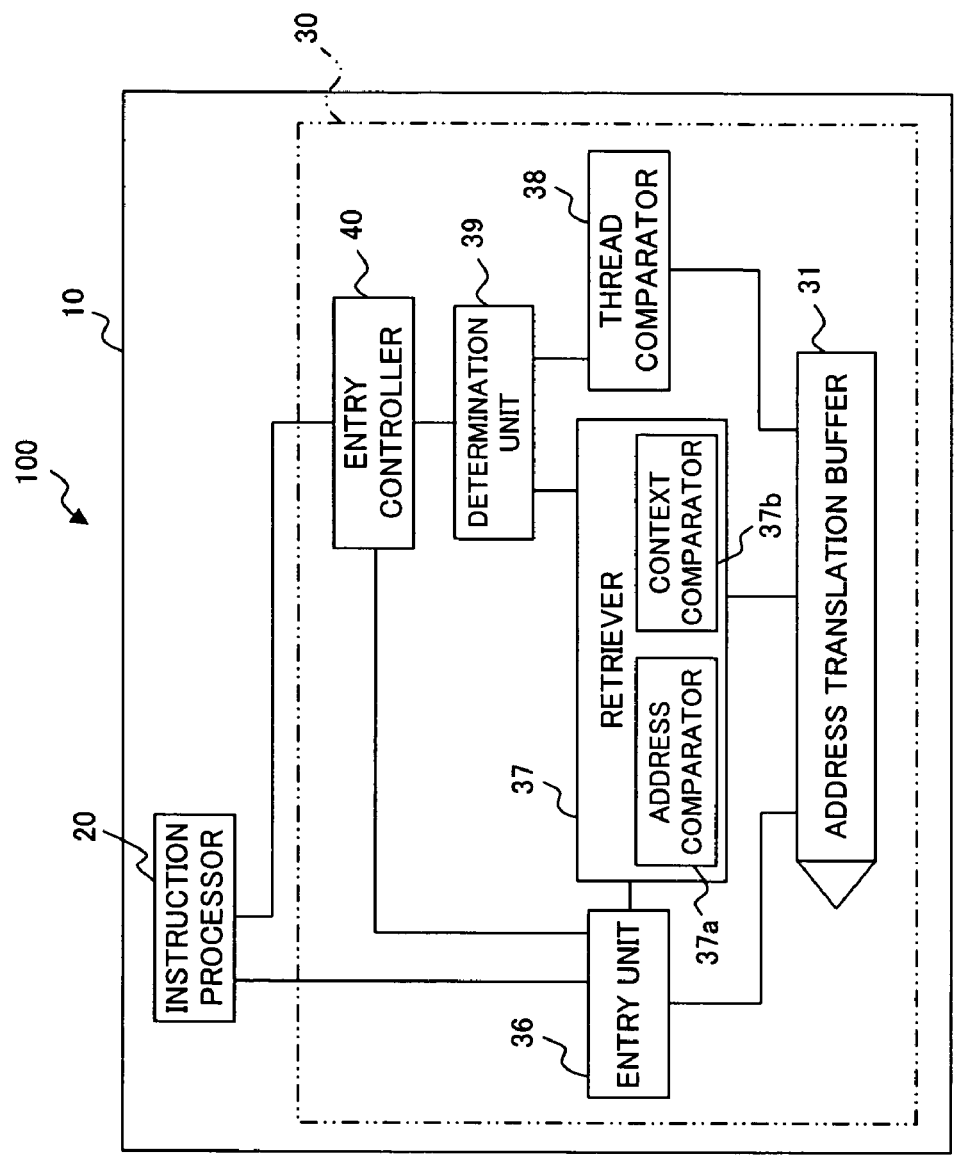
FIG. 5 is a block diagram showing an arrangement of an information processor according to the second embodiment of the present invention.

FIG. 5 is a block diagram showing an arrangement of an information processor unit 100 according to the second embodiment of the present invention. Note that, in FIG. 5, numerals identical to those previously used denote identical elements or generally identical elements.

As shown in FIG. 5, the information processor unit 100 according to the second embodiment of the present invention comprises an instruction processor 20 and an address translation controller 30 in a processor unit 10. Since the processor unit 10 and the instruction processor 20 are identical to the processor unit 10 and the instruction processor 20 of the first embodiment, respectively, detailed description of these is omitted here.

The address translation controller 30 comprises an address translation buffer 31, an entry unit 36, a retriever 37, a thread comparator 38, a determination unit 39 and an entry controller 40. Since the address translation buffer 31 is identical to the address translation buffer 31 of the first embodiment (see FIG. 2), detailed description of the address translation buffer 31 is omitted here.

The entry unit 36 registers virtual addresses used for each thread by the TLB miss handler or the like, and physical addresses corresponding to the virtual addresses into the address translation buffer 31 as address translation pairs.

Figure 6:
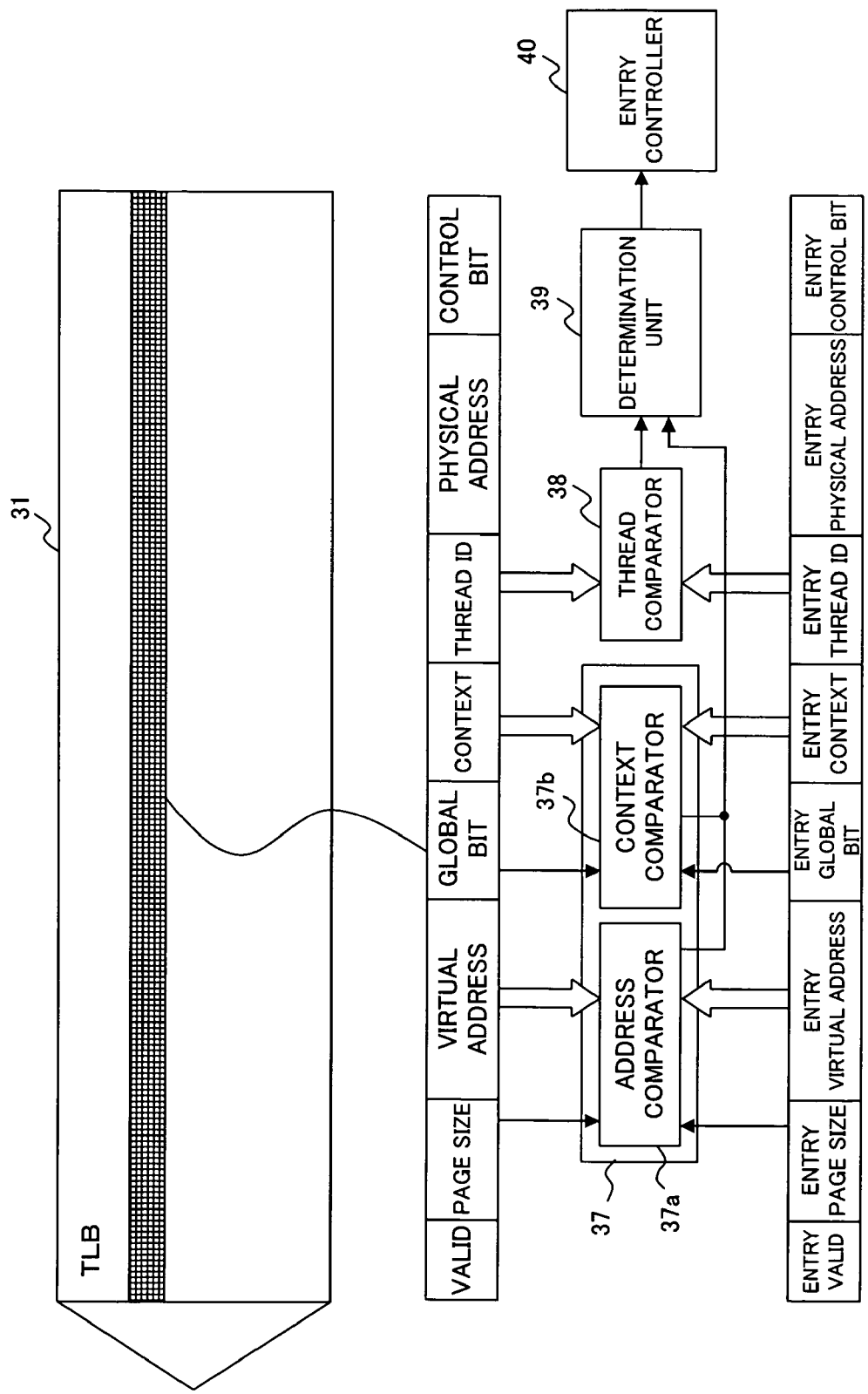
FIG. 6 is a diagram illustrating a retriever and thread comparator of the information processor according to the second embodiment of the present invention.

FIG. 6 is a diagram illustrating the retriever 37, the thread comparator 38, the determination unit 39 and the entry controller 40 in the information processor unit 100 according to the second embodiment of the present invention.

As shown in FIG. 6, the retriever 37 retrieves, from address translation buffer 31, a virtual address (i.e., an address translation pair identical to the address translation pair to be registered by the entry unit 36) identical to the virtual address of the address translation pair to be registered (expressed as "Entry Virtual Address" in FIG. 6) when registering address translation pairs by the entry unit 36, wherein the function and the arrangement of the retriever 37 are similar to the retriever 32 in the first embodiment.

In other words, the retriever 37, also comprising a address comparator 37a and a context comparator 37b, has a similar function with the only difference being that a virtual address to be newly registered (Entry Virtual Address) is the virtual address to be retrieved for the address comparator 37, whereas a virtual address to be translated (Access Virtual Address; see FIG. 3) is the virtual address to be retrieved for the address comparator 32a in the first embodiment described above.

In addition, the context comparator 37b also has a similar function with the only difference being that the context of a virtual address to be newly registered (expressed as "Entry Context" in FIG. 6) is the context to be retrieved for the context comparator 37b, whereas the context of a virtual address to be translated (Access Context; see FIG. 3) is the context to be retrieved for the context comparator 32b in the first embodiment.

The Thread comparator 38 executes comparison of the thread using the virtual address of the address translation pair to be registered by the entry unit 36 (expressed as "Entry Thread" in FIG. 6) with the thread information stored in the address translation buffer 31 (expressed as "Thread ID" in FIG. 6). The thread comparator 38 also has a similar function with the only difference being that the thread of a virtual address to be newly registered (Entry Thread) is the thread to be retrieved for the thread comparator 38, whereas the thread of a virtual address to be translated (Access Thread; see FIG. 3) is the thread to be retrieved for the thread comparator 33 in the first embodiment.

The determination unit 39 determines, in addition to the result of retrieval by the retriever 37, the result of comparison by the thread comparator 38. In other words, the determination unit 39 determines whether or not the address translation pair relating to a virtual address identical to the virtual address to be registered by the entry unit 36 is retrieved by the retriever 37, and whether or not the result of comparison by the thread comparator 38 shows a match.

In other words the determination unit 39 determines, in the case where the address translation pair relating to a virtual address identical to the virtual address to be registered is retrieved from address translation buffer 31 by the retriever 37, whether or not the result of comparison by thread comparator 38 of the thread information corresponding to the address translation pair retrieved by the retriever 37 shows a match.

The entry controller 40, referring to the result of determination by the determination unit 34 (i.e., based on the result of retrieval by the retriever 37 as well as the result of comparison by the thread comparator 38), controls registration of address translation pairs into the address translation buffer 31 by the entry unit 36, and directs the entry unit 36 to register the address translation pair if no virtual address of the address translation pair to be registered by the entry unit 36 is retrieved from the address translation buffer 31 by retriever 37.

In addition, the entry controller 40, refers to the result of determination by the determination unit 39, in the case where a virtual address identical to the virtual address of the address translation pair to be registered by the entry unit 36 is retrieved from the address translation buffer 31 by the retriever 37, and directs the entry unit 36 to register the address translation pair into address translation buffer 31 if the determination unit 39 determined that, according the result of comparison by the thread comparator 38, the thread information (Thread ID) added to the address translation pair retrieved by the retriever 37 is identical to the thread (Entry Thread) using the virtual address of the address translation pair to be registered by the entry unit 36.

On the other hand, in the case where a virtual address identical to the virtual address of the address translation pair to be registered by the entry unit 36 is retrieved from the address translation buffer 31 by retriever 37, the entry controller 40 prevents the entry unit 36 from registering the address translation pair into the address translation buffer 31, if the determination unit 39 has determined that, according to the comparison by the thread comparator 38, the thread information (Thread ID) and the thread (Entry Thread) are different.

Figure 7:
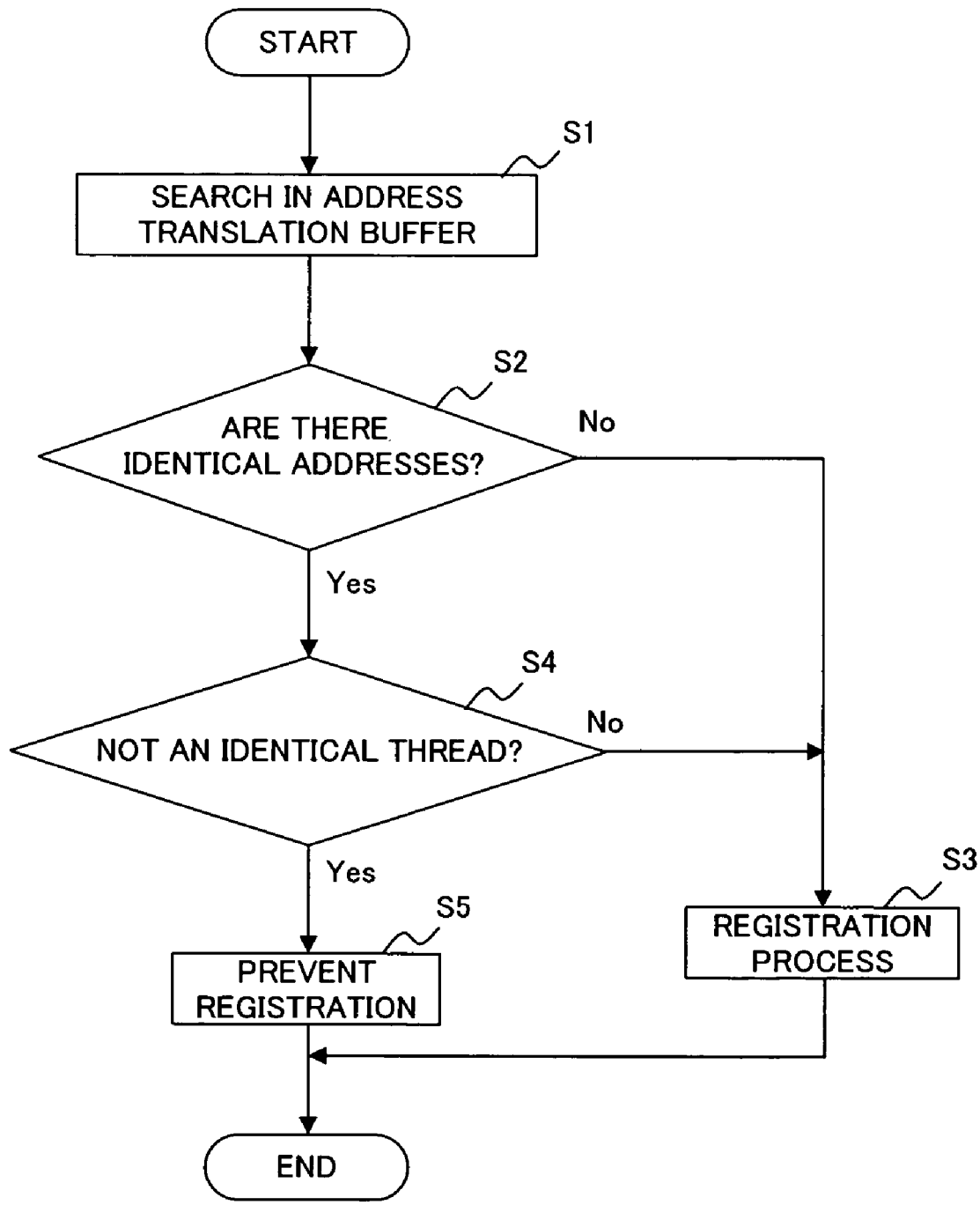
FIG. 7 is a flow chart illustrating a procedure of the multi-hit control method according to the second embodiment of the present invention.

A multi-hit control method (operation of the information processor 100) as the second embodiment of the present invention will be described next. FIG. 7 is a flow chart (steps S1-S5) illustrating the procedure of the multi-hit control method according to the second embodiment of the present invention. As shown in FIG. 7, with information processor unit 100 of the present invention, when the entry unit 36 registers a virtual address used for each thread and a physical address corresponding to the virtual address as the address translation pair into the address translation buffer 31 by the TLB miss handler or the like, the retriever 37 first retrieves from the address translation buffer 31 an address translation pair relating to a virtual address identical to the virtual address to be newly registered by the entry unit 36 (step S1).

Then, according to the result of retrieval by the retriever 37, if there is no virtual address identical to the virtual address to be registered into address translation buffer 31 by the entry unit 36 (No route of step S2), the entry controller 40 directs the entry unit 36 to register the address translation pair (step S3), and the process is completed.

However, according to the result of retrieval by the retriever 37, if there exists, in the address translation buffer 31, a virtual address identical to the virtual address to be registered by the entry unit 36 (Yes route of step S2), the entry controller 40 refers to the result of determination by the determination unit 39.

In other words, if the determination unit 39 determines that, according to the result of comparison by the thread comparator 38, the thread information which registered the virtual address (address translation pair) retrieved by retriever 37 is identical to the thread using the virtual address to be registered by the entry unit 36 (No route of step S4), the entry controller 40 directs the entry unit 36 to register the address translation pair (step S3), and the process is completed.

However, if the determination unit 39 determines that, according to the result of comparison by the thread comparator 38, the thread information which registered the virtual address (address translation pair) retrieved by the retriever 37 is not identical to the thread using the virtual address to be registered by the entry unit (Yes route of step S4), the entry controller 40 prevents entry unit 36 from registering the address translation pair (step S5), and the process is completed.

As described above, according to the information processor unit 100 and the multi-thread control method according to the second embodiment of the present invention, since the entry controller 40 directs the entry unit 36 to register the address translation pair into the address translation buffer 31 in the case where thread information indicating the thread which registered the address translation pair is added to the address translation pair stored in the address translation buffer 31, a virtual address identical to the virtual address of the address translation pair to be registered by the entry unit 36 is retrieved from the address translation buffer 31 by the retriever 37, and, according to the result of determination by the determination unit 39 (result of comparison by the thread comparator 38), the thread information added to the address translation pair relating to the virtual address retrieved by the retriever 37 is identical to the thread using the virtual address of the address translation pair to be registered by the entry unit 36, occurrence of an event such as registering identical address translation pairs from the same thread is determined to be due to malfunction of the OS of the information processor 100 and multi-hits in association with to this malfunction of the OS are without fail detected and outputted in the address translation process using the address translation buffer 31, whereby security of the information processor 100 can be ensured.

However, since the entry controller 40 prevents the entry unit 36 from registering the address translation pair into the address translation buffer 31, in the case where a virtual address identical to the virtual address of the address translation pair to be registered by the entry unit 36 is retrieved from the address translation buffer 31 by the retriever 37, and, according to the result of determination by the determination unit 39 (result of comparison by the thread comparator 38), the thread information added to the address translation pair relating to the virtual address retrieved by the retriever 37 is not identical to the thread using the virtual address of the address translation pair to be registered by the entry unit 36, registration of a plurality of address translation pairs having an identical virtual address into the address translation buffer 31 can be without fail suppressed. Therefore, in the information processor unit 100 operating in multi-thread mode, undesirable multi-hits except multi-hits due to malfunction of the OS do not occur when actually executing address translation using the address translation buffer 31, and the address translation process can be executed smoothly and without fail. In other words, occurrence of the penalty of deleting and re-registering all the address translation pairs in the address translation buffer 31 due to undesirable multi-hits can be suppressed thereby preventing performance degradation (delay of processing) of the CPU 10.

Moreover, utilization efficiency of the address translation buffer 31 can be improved because registration of identical address translation pairs from different threads into the address translation buffer 31 is prevented, which, as a result, can improve the performance of the address translation process using the address translation buffer 31.

[3] An Exemplary Variation of the Present Invention

Note that the present invention is not limited to the above-mentioned embodiments and allows for many variations in a range not deviating from the spirit of the present invention.

For example, although comparison by the thread comparator 33 in the first embodiment described above, to which the present invention is not limited, is arranged to be executed whenever the address translation is executed, it may be arranged such that comparison by the thread comparator 33 is executed only when a plurality of virtual addresses to be translated is retrieved from the address translation buffer 31 by the retriever 32, providing a similar advantage as with the first embodiment described above. Note that, in this case, the multi-hit controller 35 may be arranged to direct the thread comparator 33 to execute comparison.

In addition, although comparison by the thread comparator 38 in the second embodiment described above, to which the present invention is not limited, is arranged to be executed whenever an address translation pair is registered into the address translation buffer 31 by the entry unit 36, it may be arranged such that comparison by the thread comparator 38 is executed only when an address translation pair relating to a virtual address identical to the virtual address registered by the entry unit 36 is retrieved from the address translation buffer 31 by the retriever 37, enabling a similar advantage as with the second embodiment described above. Note that, in this case, the entry controller 40 may be arranged to direct the thread comparator 38 to execute comparison.

Furthermore, although output of multi-hits in the first embodiment described above, to which the present invention is not limited, is suppressed provided that the plurality of thread information are different, it may be arranged such that output of multi-hits is suppressed when a predefined condition other than the above is satisfied.

In addition, although the information processor 1 in the first embodiment described above, to which the present invention is not limited, is illustrated by way of an example comprising a determination unit 34 and a multi-hit controller 35 individually, it may be arranged such that the multi-hit controller 35 comprises a determination unit 34.

Furthermore, although the information processor 100 in the second embodiment described above, to which the present invention is not limited, is illustrated by way of an example comprising a determination unit 39 and an entry controller 40 individually, it may be arranged such that the entry controller 40 comprises the unit 39.

[4] Others

The above-described functions as the instruction processor 20, the address comparators 32a, 37a, the context comparators 32b, 37b, the thread comparators 33, 38, the determination units 34, 39, the multi-hit controller 35, the entry unit 36, and the entry controller 40 can be implemented by executing a predefined application program (multi-hit control program) by a computer (including CPU, an information processor, various terminals).

The program is provided in the form of records made on computer-readable media such as, for example, flexible discs, CD-ROMs, CD-Rs, CD-RWs, DVDs, or the like. In this case, the computer reads out the multi-hit control program from the recording medium, transfers and stores it into an internal storage device or an external storage device for use. In addition, the program may be recorded on storage devices (storage media) such as, for example, magnetic disks, optical disks, magneto-optical disks, or the like, so that it may be provided from the storage device to a computer via a communication network.

Here, a computer, referring to a concept including hardware and OS (operating system), is a hardware, which operates under control of the OS. In addition, when an OS is unnecessary and application program alone can operate the hardware, the hardware itself is equivalent to the computer. The hardware comprises at least a microprocessor such as a CPU and means for reading a computer program recorded on a recording medium. The application program as the above-mentioned multi-hit control program includes, in the computer described above, program codes for implementing functions as an instruction processor 20, address comparators 32a, 37a, context comparators 32b, 37b, thread comparators 33, 38, determination units 34, 39, a multi-hit controller 35, an entry unit 36, and an entry controller 40. In addition, a portion of the functions may be implemented by the OS instead of the application program.

Furthermore, as recording media for the present embodiment, a variety of computer-readable media such as IC cards, ROM cartridges, magnetic tapes, punch cards, internal storage devices of a computer (memory such as RAM and ROM), external storage devices, printed materials having symbols such as bar codes printed thereon can also be used other than flexible disks, CD-ROMs, CD-Rs, CD-RWs, DVDs, magnetic disks, optical disks, magneto-optical disks described above.

What is claimed is:

1. An information processor which operates in multi-thread mode, said processor comprising:
    an address translation buffer for storing address translation pairs indicating the correspondence between virtual addresses and physical addresses;
    an entry unit for registering a virtual address used in each thread and a physical address corresponding to said virtual address into said address translation buffer as said address translation pair;
    a retriever for retrieving, from said address translation buffer, a virtual address identical to the virtual address of said address translation pair to be registered, when registering said address translation pair by said entry unit; and
    an entry controller for preventing said entry unit from registering said address translation pair into said address translation buffer if a virtual address identical to the virtual address of the address translation pair to be registered by said entry unit is retrieved by said retriever,
    wherein said address translation buffer stores thread information indicating the thread which registered said address translation pair by adding to said address translation pair,
    said processor further comprises a thread comparator for comparing said thread information added to said address translation pair retrieved by said retriever with the thread using the virtual address of the address translation pair registered by said entry unit, if a virtual address identical to the virtual address of the address translation pair registered by said entry unit is retrieved from said address translation buffer by said retriever,
    wherein said entry controller directs said entry unit to register said address translation pair into said address translation buffer to cause a multi-hit controller to output multi-hits as an OS malfunction when using the address translation buffer, if said thread information added to said address translation pair retrieved by said retriever is identical to the thread using the virtual address of the address translation pair registered by said entry unit, according to the result of comparison by said thread comparator, and, prevents said entry unit from registering said address translation pair into said address translation buffer if said thread information is not identical to said thread, according to the result of comparison by said thread comparator.

2. The information processor according to claim 1, wherein a context is added to said address translation pair stored in said address translation buffer, and said retriever comprises a context comparator for comparing the context of the address translation pair to be registered by said entry unit with the context added to said address translation pair stored in said address translation buffer.

3. The information processor according to claim 2, wherein context valid/invalid information indicating the validity/invalidity of the context is added to said context added to said address translation pair stored in said address translation buffer, and
    said context comparator, referring to said context valid/invalid information, executes comparison of said contexts if said context valid/invalid information is valid, and, skips comparison of said contexts if said context valid/invalid information is invalid.

4. An information processor which operates in multi-thread mode, said processor comprising:
    an address translation buffer for storing address translation pairs indicating the correspondence between virtual addresses and physical addresses and for storing thread information indicating the thread which registered said address translation pair;
    an entry unit for registering a virtual address used in each thread and a physical address corresponding to said virtual address into said address translation buffer as said address translation pair;
    a retriever for retrieving, from said address translation buffer, a virtual address identical to the virtual address of said address translation pair to be registered, when registering said address translation pair by said entry unit; and
    an entry controller for preventing said entry unit from registering said address translation pair into said address translation buffer if a virtual address identical to the virtual address of the address translation pair to be registered by said entry unit is retrieved from said address translation buffer by said retriever and if the thread information indicating the thread which registered said address translation pair retrieved by said retriever is not identical to the thread using the virtual address of the address translation pair to be registered by said entry unit,
    wherein said entry controller directs said entry unit to register said address translation pair into said address translation buffer to cause a multi-hit controller to output multi-hits as an OS malfunction when using the address translation buffer, if a virtual address identical to the virtual address of the address translation pair to be registered by said entry unit is retrieved from said address translation buffer by said retriever and if the thread information corresponding to said address translation pair retrieved by said retriever is identical to the thread using the virtual address of the address translation pair to be registered by said entry unit.

5. The information processor according to claim 4, wherein a context is added to said address translation pair stored in said address translation buffer, and said retriever comprises a context comparator for comparing the context of the address translation pair to be registered by said entry unit with the context added to said address translation pair stored in said address translation buffer.

6. The information processor according to claim 5, wherein said processor adds context valid/invalid information indicating the validity/invalidity of the context to said context which is added to said address translation pair stored in said address translation buffer, and said context comparator, referring to said context valid/invalid information, executes comparison of said contexts if said context valid/invalid information is valid, and, skips comparison of said contexts if said context valid/invalid information is invalid.

7. A multi-hit control method for an information processor which operates in multi-thread mode, said processor comprising an address translation buffer for storing address translation pairs indicating the correspondence between virtual addresses and physical addresses, an entry unit for registering a virtual address used in each thread and a physical address corresponding to said virtual address into said address translation buffer as said address translation pair, and a retriever for retrieving, from said address translation buffer, a virtual address identical to the virtual address of the address translation pair to be registered by said entry unit, when registering said address translation pair by said entry unit, said method comprising:

adding thread information indicating the thread which registered the address translation pair to said address translation pair stored in said address translation buffer;

comparing said thread information added to said address translation pair relating to the virtual address retrieved by said retriever with the thread using the virtual address of the address translation pair registered by said entry unit, if a virtual address identical to the virtual address of the address translation pair registered by said entry unit is retrieved from said address translation buffer by said retriever;

directing said entry unit to register said address translation pair into said address translation buffer to cause a multi-hit controller to output multi-hits as an OS malfunction when using the address translation buffer, if said thread information added to said address translation pair relating to the virtual address retrieved by said retriever is identical to the thread using the virtual address of the address translation pair registered by said entry unit, according to the result of comparison; and preventing said entry unit from registering said address translation pair into said address translation buffer if said thread information is not identical to said thread, according to the result of comparison.

8. A multi-hit control method for an information processor which operates in multi-thread mode, said processor comprising an address translation buffer for storing address translation pairs indicating the correspondence between virtual addresses and physical addresses, an entry unit for registering a virtual address used in each thread and a physical address corresponding to said virtual address into said address translation buffer as said address translation pair, and a retriever for retrieving, from said address translation buffer, a virtual address identical to the virtual address of said address translation pair to be registered, when registering said address translation pair by said entry unit, wherein said method comprises:

adding thread information indicating the thread which registered the address translation pair to said address translation pair stored in said address translation buffer;

preventing said entry unit from registering said address translation pair into said address translation buffer if a virtual address identical to the virtual address of the address translation pair to be registered by said entry unit is retrieved from said address translation buffer by said retriever and if said thread information added to an address translation pair relating to the virtual address retrieved by said retriever is not identical to the thread using the virtual address of the address translation pair to be registered by said entry unit; and directing said entry unit to register said address translation pair into said address translation buffer to cause a multi-hit controller to output multi-hits as an OS malfunction when using the address translation buffer, if a virtual address identical to the virtual address of said address translation pair to be registered by said entry unit is retrieved from said address translation buffer by said retriever and if the thread information added to an address translation pair relating to the virtual address retrieved by said retriever is identical to the thread using the virtual address of the address translation pair to be registered by said entry unit.

\* \* \* \* \*